E. S. TAYLOR.
Measuring Apparatus for Seed-Heaters.

No. 198,706. Patented Dec. 25, 1877.

Witnesses
Chas. H. Smith
Geo. T. Pinckney

Inventor
Edwin S. Taylor
per Lemuel W. Serrell
atty.

UNITED STATES PATENT OFFICE.

EDWIN S. TAYLOR, OF BROOKLYN, NEW YORK.

IMPROVEMENT IN MEASURING APPARATUS FOR SEED-HEATERS.

Specification forming part of Letters Patent No. 198,706, dated December 25, 1877; application filed November 22, 1877.

*To all whom it may concern:*

Be it known that I, EDWIN S. TAYLOR, of Brooklyn, in the county of Kings and State of New York, have invented an Improvement in Heating and Measuring Apparatus for Oil-Works, of which the following is a specification:

In the manufacture of oil from flax-seed, cotton-seed, &c., it is usual to grind the seed and then heat it in a vat or kettle with a surrounding steam-jacket, and then to place the meal into bags and press the same between plates in a hydraulic or other press.

Difficulty has been experienced in supplying the meal uniformly to the bags, and measuring-hoppers have been devised with that object in view; but, in consequence of the labor attending the use of the measuring-hopper, the workmen often discard the same, and the quantity of meal placed in the bags varies; hence there is risk of the press being injured, and the yield of oil lessened by the inequality of pressure.

The object of my invention is to insure uniformity in the quantity of the meal supplied to each bag, and to render it necessary for the workman to employ the measuring apparatus in order to obtain any supply of the meal from the cooking-kettle to the bag.

Figure 1:
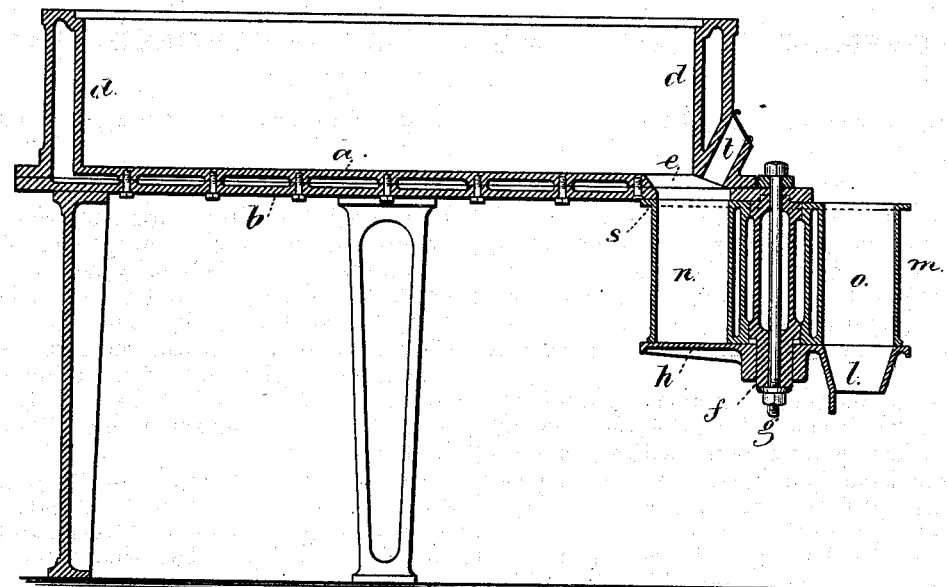
Figure 2:
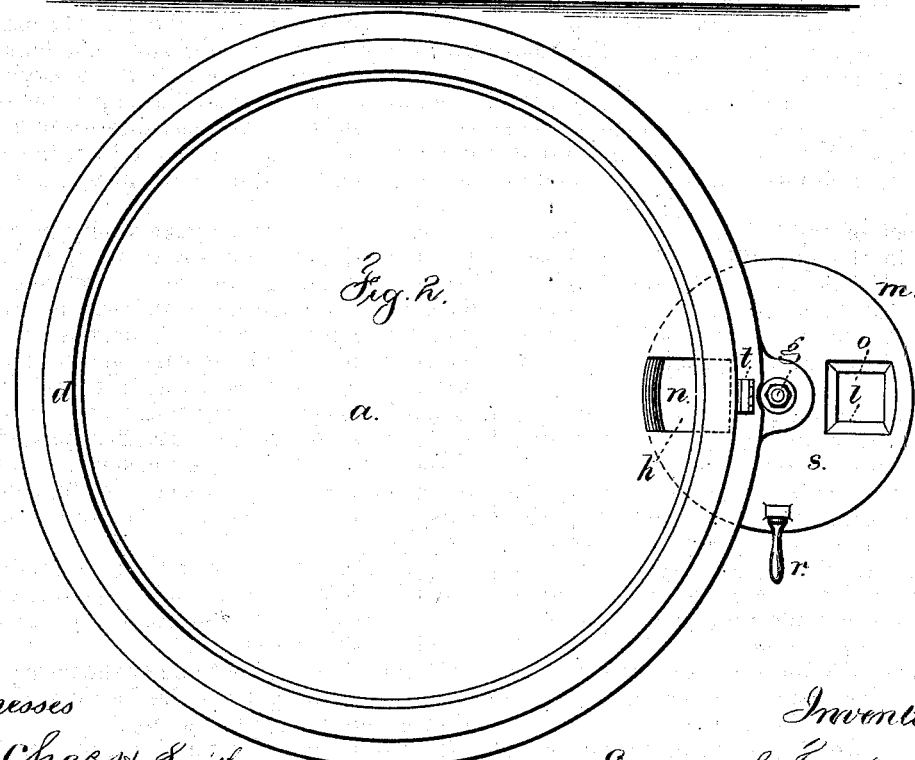

In the drawings, Figure 1 is a vertical section of the kettle and measuring apparatus, and Fig. 2 is a plan of the same.

The kettle or vessel in which the meal is heated or cooked is formed of the two plates *a b* at the bottom, bolted together, and having intervening ribs or washers, to keep the plates apart and form a space for the introduction of steam under pressure to heat up the kettle and its contents.

The curb or cylinder *d* is also made with an intermediate steam-space, to heat the sides of the kettle.

There is a revolving agitator or stirrer, of usual construction, that moves the meal gradually from the center toward the circumference; and lids or covers also are provided, of ordinary construction.

At one side of the kettle there is an opening through the bottom at *e*, and contiguous thereto is a vertical column, *f*, that is hollow, for the passage of a bolt, *g*, by means of which the column is firmly bolted to the under side of the rim of the kettle. The lower part of this column is cylindrical, and receives upon it the circular plate *h*, that has a hollow hub for said column, and is bolted firmly to the column by a lateral set-screw, or similar clamping device.

In this plate *h* there is an opening, and below the same the hopper *l*, that is of a size and shape adapted to receive around it the upper end of the bag that receives the meal.

Around the column *f* there is the semi-rotary measurer *m*, having two chambers, *n o*, that pass vertically through the rotary measurer; and there is a handle, *r*, upon the circular top plate *s* of said measurer, that serves to move the same, and also to limit the movement to a half-rotation, first one way and then the other.

When the handle *r* and revolving measurer are moved, one chamber, *n*, is brought beneath the opening *e* to receive the meal from the kettle, and the other chamber, *o*, is brought over the delivery-hopper *l*, for the contents thereof to pass into the bag; and it is necessary to give to the measurer this semi-rotary movement first one way and then the other, in order to remove the meal that passes out of the kettle. When the measurer is turned half-way the delivery of meal is stopped, because the flat disk *s* closes the bottom of the opening *e*.

A hand or stoke hole at *t* may be made use of to allow for clearing out the opening *e* from the kettle to the measurer, should the meal become caked therein.

By this improvement one of the measuring-chambers is filling from the kettle while the other is emptying into the bag.

It will be evident that, if the handle is placed upon the side of the measure, and the top plate *s* made level, the measurer may be revolved progressively.

I claim as my invention—

1. The measurer composed of the two chambers $n$ $o$ and top plate $s$, in combination with the kettle $a$ $b$ $d$, in which the meal is heated, and the plate $h$, with a hopper for the bag, substantially as set forth.

2. The hollow column $f$, bolted to the rim of the kettle and sustaining the stationary plate $h$, in combination with the measurer, that is sustained by and is revolved around such column, substantially as set forth.

Signed by me this 16th day of November, A. D. 1877.

EDWIN S. TAYLOR.

Witnesses
   GEO. T. PINCKNEY,
   CHAS. H. SMITH.